US012703814B2

(12) United States Patent
Fujita et al.

(10) Patent No.: US 12,703,814 B2
(45) Date of Patent: Aug. 11, 2026

(54) THERMOSETTING COMPOSITION, CURED PRODUCT, DEVICE, AND METHOD FOR MANUFACTURING THE DEVICE

(71) Applicant: Panasonic Intellectual Property Management Co., Ltd., Osaka (JP)

(72) Inventors: Haruka Fujita, Tokyo (JP); Takashi Saruwatari, Mie (JP); Hiroki Shinozaki, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 591 days.

(21) Appl. No.: 18/017,791

(22) PCT Filed: Jul. 19, 2021

(86) PCT No.: PCT/JP2021/026963

§ 371 (c)(1),
(2) Date: Jan. 24, 2023

(87) PCT Pub. No.: WO2022/024838

PCT Pub. Date: Feb. 3, 2022

(65) Prior Publication Data

US 2023/0287250 A1 Sep. 14, 2023

(30) Foreign Application Priority Data

Jul. 30, 2020 (JP) ................................ 2020-129617

(51) Int. Cl.
*C09J 163/00* (2006.01)

(52) U.S. Cl.
CPC .................................. *C09J 163/00* (2013.01)

(58) Field of Classification Search
None
See application file for complete search history.

(56) References Cited

U.S. PATENT DOCUMENTS

| | | | |
|---|---|---|---|
| 2007/0096056 | A1 | 5/2007 | Takeuchi et al. |
| 2010/0022745 | A1 | 1/2010 | Takeuchi et al. |
| 2018/0044478 | A1 | 2/2018 | Iwaya et al. |
| 2020/0385513 | A1 | 12/2020 | Zillessen et al. |

FOREIGN PATENT DOCUMENTS

| | | | |
|---|---|---|---|
| JP | 2000-154226 | A | 6/2000 |
| JP | 2018-172565 | A | 11/2018 |
| JP | 2019-123824 | A | 7/2019 |
| JP | 7014998 | * | 7/2019 |
| JP | 2020-045435 | A | 3/2020 |
| KR | 10-2020-0089323 | A | 7/2020 |
| TW | 201641576 | A | 12/2016 |
| TW | 201936775 | A | 9/2019 |
| WO | 2005/052021 | A1 | 6/2005 |
| WO | WO 2020/080390 | * | 4/2020 |

OTHER PUBLICATIONS

Machine translation of WO 2020/080390 (Year: 2020).*
Machine translation of JP 7014998 (Year: 2019).*
International Search Report dated Sep. 7, 2021 issued in International Patent Application No. PCT/JP2021/026963, with English translation.

* cited by examiner

*Primary Examiner* — Robert T Butcher
(74) *Attorney, Agent, or Firm* — RIMON P.C.

(57) ABSTRACT

A thermosetting composition according to the present disclosure contains: an epoxy resin (A); a thiol compound (B) having at least two thiol groups per molecule; a radical polymerizable compound (C); a photo radical polymerization initiator (D); and a radical scavenger (E).

14 Claims, No Drawings

THERMOSETTING COMPOSITION, CURED PRODUCT, DEVICE, AND METHOD FOR MANUFACTURING THE DEVICE

CROSS-REFERENCE OF RELATED APPLICATIONS

This application is the U.S. National Phase under 35 U.S.C. § 371 of International Patent Application No. PCT/JP2021/026963, filed on Jul. 19, 2021, which in turn claims the benefit of Japanese Patent Application No. 2020-129617, filed on Jul. 30, 2020, the entire disclosures of which Applications are incorporated by reference herein.

TECHNICAL FIELD

The present disclosure generally relates to a thermosetting composition, a cured product, a device, and a method for manufacturing the device. More particularly, the present disclosure relates to a thermosetting composition containing an epoxy resin and a thiol compound, a cured product formed by curing the thermosetting composition, a device to be manufactured using the thermosetting composition, and a method for manufacturing such a device using the thermosetting composition.

BACKGROUND ART

An adhesive containing an epoxy resin and a thiol compound is one of various types of adhesives (see, for example, Patent Literature 1). This type of adhesive has excellent low-temperature curing ability. In addition, a cured product thereof tends to have flexibility.

CITATION LIST

Patent Literature

Patent Literature 1: JP 2019-123824 A

SUMMARY OF INVENTION

The problem to be overcome by the present disclosure is to provide a thermosetting composition containing an epoxy resin and a thiol compound, enabling temporary bonding, and having good storage stability, a cured product formed by curing the thermosetting composition, a device to be manufactured using the thermosetting composition, and a method for manufacturing such a device using the thermosetting composition.

A thermosetting composition according to an aspect of the present disclosure contains: an epoxy resin (A); a thiol compound (B) having at least two thiol groups per molecule; a radical polymerizable compound (C); a photo radical polymerization initiator (D); and a radical scavenger (E).

A cured product according to another aspect of the present disclosure is formed by curing the thermosetting composition described above.

A device according to still another aspect of the present disclosure includes: a first part; a second part; and a cured product interposed between the first part and the second part to bond the first part and the second part together. The cured product is formed by curing the thermosetting composition described above.

A method for manufacturing a device according to yet another aspect of the present disclosure is a method for manufacturing a device including: a first part; a second part; and a cured product interposed between the first part and the second part to bond the first part and the second part together. The method includes: interposing the thermosetting composition described above between the first part and the second part; irradiating the thermosetting composition with light to temporarily bond the first part and the second part together; and then heating the thermosetting composition to form the cured product.

DESCRIPTION OF EMBODIMENTS

First, it will be described generally how the present inventors conceived the concept of the present disclosure.

Generally speaking, when a part of a precision device such as a camera module needs to be bonded, the part often has low thermal resistance. In addition, in such a situation, it is highly necessary to avoid causing a dimensional change due a variation in temperature during the bonding process, and therefore, a thermosetting adhesive which is curable at a low temperature is often used. Furthermore, to allow the precision device to withstand the impact that would be applied thereto if the device dropped to the ground, a cured product of the adhesive preferably has a low elastic modulus. The present inventors considered using a thermosetting composition containing an epoxy resin and a thiol compound as an adhesive that would meet all of these requirements.

Nevertheless, the present inventors discovered via research that the epoxy resin and the thiol compound could be reacted at a low temperature but exhibited poor storage stability. Also, in an application that requires sufficient alignment precision, the parts are sometimes temporarily fixed by photo-curing the adhesive. However, it has been difficult to temporarily bond the parts by photocuring using only the epoxy resin and the thiol compound. Therefore, it has been difficult to apply such a thermosetting composition to precision devices that require high alignment precision.

The present inventors also considered that sufficient adhesion strength would be ensured if photocurability was imparted to the thermosetting composition. That is to say, the present inventors considered that sufficient adhesion strength would be ensured by photocuring the thermosetting composition first to temporarily bond the parts together and then thermally curing the thermosetting composition.

Nevertheless, the present inventors discovered that if the thermosetting composition contained a radical reactive compound to impart photocurability thereto, then the storage stability of the thermosetting composition decreased significantly.

Thus, the present inventors carried out extensive research and development to provide a thermosetting composition containing an epoxy resin and a thiol compound, enabling temporary bonding, and having good storage stability. As a result of the extensive research and development, the present inventors conceived the concept of the present disclosure.

Note that although the present inventors conceived the concept of the present disclosure by going through the trial and error described above, a thermosetting composition according to the present disclosure may be used, as an adhesive, to bond anything. That is to say, it should be noted that the intended use of the thermosetting composition is not limited to bonding parts of a precision device such as a camera module. In addition, the thermosetting composition according to the present disclosure may also be used in an application that does not require temporary bonding. Furthermore, the thermosetting composition according to the present disclosure is preferably used as an adhesive but may also be used as any other type of agent, not just as an adhesive. For example, the thermosetting composition according to the present disclosure may also be used as an encapsulant for electronic parts.

Next, an exemplary embodiment of the present disclosure will be described. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure.

A thermosetting composition according to this embodiment (hereinafter also referred to as a "composition (X)") contains: an epoxy resin (A); a thiol compound (B) having at least two thiol groups per molecule; a radical polymerizable compound (C); a photo radical polymerization initiator (D); and a radical scavenger (E).

Thus, when the composition (X) is exposed to light, the actions of the radical polymerizable compound (C) and the photo radical polymerization initiator (D) and the actions of the thiol compound (B), the radical polymerizable compound (C) and the photo radical polymerization initiator (D) cause the composition (X) to be cured, thus enabling temporary bonding. In addition, the composition (X) contains the radical scavenger (E) and therefore may have its storage stability improved. The reason is presumably as follows. The thiol compound (B) is not only reactive with the epoxy resin (A) but also readily reactive with the radical polymerizable compound (C) as well. Thus, adding the radical polymerizable compound (C) to a system in which the epoxy resin (A) and the thiol compound (B) are present as a mixture would cause a decline in the storage stability due to the reaction between the thiol compound (B) and the radical polymerizable compound (C). However, if the system further includes the radical scavenger (E), then the radical scavenger (E) would scavenge the radicals in the system, thus suppressing the reaction between the thiol compound (B) and the radical polymerizable compound (C). The composition (X) would have its storage stability improved by such a mechanism. That is to say, according to this embodiment, the radical scavenger (E) suppresses not just the reaction of the radical polymerizable compound (C) but also the reaction between the thiol compound (B) and the radical polymerizable compound (C) as well, thus improving the storage stability.

Next, the respective components of the composition (X) will be described in further detail.

As described above, the composition (X) contains the epoxy resin (A) and the thiol compound (B). This allows the composition (X) to be cured at a relatively low temperature. In addition, a cured product formed by curing the composition (X) is allowed have a low elastic modulus by appropriately determining the respective types of the epoxy resin (A) and the thiol compound (B) and appropriately setting their proportions at the time of compounding. For example, this may allow the cured product to have an elastic modulus equal to or less than 1500 MPa, preferably equal to or less than 1000 MPa, and more preferably equal to or less than 500 MPa.

The epoxy resin (A) may be any compound having an epoxy group. The epoxy resin (A) may contain at least one selected from the group consisting of monomers, oligomers, and prepolymers. The epoxy resin (A) preferably contains a compound having at least two epoxy groups per molecule.

The epoxy resin (A) contains at least one selected from the group consisting of: polyglycidyl ether produced by reacting epichlorohydrin with a polyvalent phenol such as bisphenol A, bisphenol F, bisphenol AD, catechol, or resorcinol, or a polyhydric alcohol such as glycerin or polyethylene glycol; glycidyl ether ester produced by reacting epichlorohydrin with a hydroxycarboxylic acid such as p-hydroxybenzoic acid or β-hydroxynaphthoic acid; polyglycidyl ester produced by reacting epichlorohydrin with a polycarboxylic acid such as phthalic acid or terephthalic acid; and epoxidized phenol-novolac resins, epoxidized cresol-novolac resins, epoxidized polyolefin, cyclic aliphatic epoxy resins, and other urethane-modified epoxy resins.

The epoxy resin (A) preferably includes at least one selected from the group consisting of bisphenol A epoxy resins, bisphenol F epoxy resins, phenol-novolac epoxy resins, biphenyl aralkyl epoxy resins, phenol aralkyl epoxy resins, aromatic glycidyl amine epoxy resins, and epoxy resins having a dicyclopentadiene structure, among other things.

Note that these are only exemplary components which may be contained in the epoxy resin (A) and should not be construed as limiting.

The epoxy resin (A) may have an epoxy equivalent equal to or greater than 50 g/eq and equal to or less than 100 g/eq, for example. The epoxy equivalent is more preferably equal to or greater than 70 g/eq and even more preferably equal to or greater than 100 g/eq. Also, the epoxy equivalent is more preferably equal to or less than 700 g/eq and even more preferably equal to or less than 500 g/eq.

The proportion of the epoxy resin (A) with respect to the total of the epoxy resin (A), the thiol compound (B), and the radical polymerizable compound (C) may be equal to or greater than 5% by mass, is preferably equal to or greater than 10% by mass, and more preferably equal to or greater than 15% by mass. Also, this proportion may be equal to or less than 70% by mass, is preferably equal to or less than 60% by mass, and even more preferably equal to or less than 50% by mass.

A thiol compound (B) may be any compound having at least two thiol groups per molecule. The thiol compound (B) preferably includes a compound having three to six thiol groups per molecule.

The ratio of the thiol group equivalent of the thiol compound (B) to one epoxy equivalent of the epoxy resin (A) is preferably equal to or greater than 0.50 and equal to or less than 10.0. This equivalent ratio is more preferably equal to or greater than 0.75 and equal to or less than 5.0, and even more preferably equal to or greater than 0.80 and equal to or less than 3.0. Also, the content of the thiol compound (B) with respect to 100 parts by mass of the epoxy resin (A) may be, for example, equal to or greater than 1 part by mass and equal to or less than 200 parts by mass, is preferably equal to or greater than 5 parts by mass and equal to or less than 200 parts by mass, and is even more preferably equal to or greater than 50 parts by mass and equal to or less than 150 parts by mass.

The thiol compound (B) contains, for example, an ester of a polyol and a mercapto organic acid. This ester contains at least one of a partial ester or a complete ester.

The polyol includes at least one selected from the group consisting of, for example, ethylene glycol, trimethylolpropane, pentaerythritol, and dipentaerythritol.

The mercapto organic acid includes at least one selected from the group consisting of: a mercapto aliphatic monocarboxylic acid; an ester containing a thiol group and a carboxy group produced by an esterification reaction between a hydroxy acid and a mercapto organic acid; a mercapto aliphatic dicarboxylic acid; and a mercapto aromatic monocarboxylic acid. The mercapto aliphatic monocarboxylic acid includes, for example, at least one selected from the group consisting of: mercaptoacetic acid; a mercaptopropionic acid such as 3-mercaptopropionic acid; and a mercaptobutyric acid such as 3-mercaptobutyric acid and 4-mercaptobutyric acid. The carbon number of the mercapto aliphatic monocarboxylic acid is preferably two to eight, more preferably two to six, even more preferably two to four, and particularly preferably three. The mercapto aliphatic monocarboxylic acid having two to eight carbon atoms includes at least one selected from the group consisting of, for example, mercaptoacetic acid, 3-mercaptopropionic acid, 3-mercaptobutyric acid, and 4-mercaptobutyric acid. The mercapto aliphatic dicarboxylic acid includes at least one selected from the group consisting of, for example, mercaptosuccinic acid and a dimercaptosuccinic acid such as 2,3-dimercaptosuccinic acid. The mercapto aromatic monocarboxylic acid includes a mercaptobenzoic acid such as 4-mercaptobenzoic acid.

The partial ester of the polyol and the mercapto organic acid includes at least one selected from the group consisting of, for example, trimethylolpropane bis(mercaptoacetate), trimethylolpropane bis(3-mercaptopropionate), trimethylolpropane bis(3-mercaptobutyrate), trimethylolpropane bis(4-mercaptobutyrate), pentaerythritol tris(mercaptoacetate), pentaerythritol tris(3-mercaptopropionate), pentaerythritol tris(3-mercaptobutyrate), pentaerythritol tris(4-mercaptobutyrate), dipentaerythritol tetrakis(mercaptoacetate), dipentaerythritol tetrakis(3-mercaptopropionate), dipentaerythritol tetrakis(3-mercaptobutyrate), and dipentaerythritol tetrakis(4-mercaptobutyrate).

Examples of the complete ester of the polyol and the mercapto organic acid includes ethylene glycol bis(mercaptoacetate), ethylene glycol bis(3-mercaptopropionate), ethylene glycol bis(3-mercaptobutyrate), ethylene glycol bis(4-mercaptobutyrate), trimethylol propane tris(mercaptoacetate), trimethylol propane tris (3-mercaptopropionate), trimethylol propane tris (3-mercaptobutyrate), trimethylol propane tris(4-mercaptobutyrate), pentaerythritol tetrakis(mercaptoacetate), pentaerythritol tetrakis(3-mercaptopropionate), pentaerythritol tetrakis(3-mercaptobutyrate), pentaerythritol tetrakis(4-mercaptobutyrate), dipentaerythritol hexakis(mercaptoacetate), dipentaerythritol hexakis(3-mercaptopropionate), dipentaerythritol hexakis (3-mercaptobutyrate), and dipentaerythritol hexakis(4-mercaptobutyrate). The complete ester of the polyol and the mercapto organic acid preferably includes at least one selected from the group consisting of pentaerythritol tetrakis (3-mercaptopropionate), pentaerythritol tetrakis(3-mercaptobutyrate), dipentaerythritol hexakis(3-mercaptopropionate), and trimethylolpropane tris(3-mercaptopropionate).

The thiol compound (B) may contain, for example, tris [(3-mercaptopropionyloxy)-ethyl]-isocyanurate and 1,3,5-tris(3-mercaptobutyloxyethyl)-1,3,5-triazine-2,4,6(1H, 3H, 5H)-trione.

The thiol compound (B) may contain any compound other than these. The thiol compound (B) may contain, for example, at least one selected from the group consisting of, for example, 1,4-butanedithiol, 1,6-hexanedithiol, 1,8-octanedithiol, 1,10-decanedithiol, 3,6-dioxa-1,8-octanedithiol, and bis-2-mercaptoethyl sulfide. The thiol compound (B) may contain at least one selected from the group consisting of, for example, tris(3-mercaptopropyl) isocyanurate, and 1,3,4,6-tetrakis(2-mercaptoethyl) glycoluril.

The radical polymerizable compound (C) may impart photocurability to the composition (X). The radical polymerizable compound (C) includes at least one of a compound having an acryloyl group and/or a methacryloyl group (hereinafter referred to as an "acrylic compound") or a compound having a vinyl group (hereinafter referred to as a "vinyl group").

The acrylic compound contains at least one selected from the group consisting of, for example, trimethylolpropane triacrylate, 1,6-hexanediol diacrylate, dimethylol-tricyclodecane diacrylate, acryloyl morpholine, tetrahydrofurfuryl acrylate, and 4-hydroxybutyl acrylate.

The vinyl compound contains at least one selected from the group consisting of, for example, triallyl isocyanurate, allyl glycidyl ether, trimethylolpropane diallyl ether, and pentaerythritol triallyl ether.

The proportion of the radical polymerizable compound (C) with respect to the total of the epoxy resin (A), the thiol compound (B), and the radical polymerizable compound (C) is preferably equal to or greater than 5% by mass and equal to or less than 30% by mass. Setting this proportion at a value equal to or greater than 5% by mass imparts sufficient photocurability to the composition (X), thus making it easier to have temporary bonding done using the composition (X). Setting this proportion at a value equal to or less than 30% by mass enables increasing the adhesion strength of the composition (X) that has been thermally cured. This proportion is more preferably equal to or greater than 8% by mass and even more preferably equal to or greater than 12% by mass. Also, this proportion is more preferably equal to or less than 25% by mass and even more preferably equal to or less than 20% by mass.

The photo radical polymerization initiator (D) contains at least one compound selected from the group consisting of, for example, aromatic ketones, acylphosphine oxide compounds, aromatic onium salt compounds, organic peroxides, thio compounds (such as thioxanthone compounds and thiophenyl group-containing compounds), hexaaryl biimidazole compounds, ketoxime ester compounds, borate compounds, azinium compounds, metallocene compounds, active ester compounds, compounds each having a carbon-halogen bond, and alkylamine compounds.

The proportion of the photo radical polymerization initiator (D) with respect to the radical polymerizable compound (C) is preferably equal to or greater than 1% by mass and equal to or less than 10% by mass. Setting this proportion at 1% by mass or more enables imparting sufficient photocurability for temporary bonding to the composition (X). Also, setting this proportion at 10% by mass or less makes it easier, when an applied film of the composition (X) is irradiated with light, to cure the applied film to a deep part thereof. This proportion is more preferably equal to or greater than 3% by mass and even more preferably equal to or greater than 5% by mass. Also, this proportion is more preferably equal to or less than 10% by mass and even more preferably equal to or less than 8% by mass.

The radical scavenger (E) contains at least one of a nitroxide compound or a carbonylthio compound, for example. The nitroxide compound (F) may contain at least one component selected from the group consisting of, for example, 2,2,6,6-tetramethyl-1-piperidinoxygen free radical (TEMPO), 4-acetamido-2,2,6,6-tetraethylpiperidine-1-oxygen free radical, 4-amino-2,2,6,6-tetramethylpiperidine-1-oxygen free radical, 4-carboxy-2,2,6,6-tetramethylpiperidine-1-oxygen free radical, 4-oxo-2,2,6,6-tetramethylpiperidine-1-oxygen free radical, 4-methacryloyloxy-2,2,6,6-tetramethylpiperidine-1-oxygen free radical, and a [[N,N'-[adamantane-2-ylidenebis(1,4-phenylene)]bis (tert-butylamine)]-N,N'-diylbisoxy] radical.

The proportion of the radical scavenger (E) with respect to the entire composition (X) is preferably equal to or greater than 0.01% by mass and equal to or less than 0.6% by mass. Setting this proportion at a value equal to or greater than 0.01% by mass makes it particularly easy to increase the storage stability of the composition (X). Also, setting this proportion at a value equal to or less than 0.6% by mass makes it easier to achieve good reactivity when the composition (X) is photo-cured. This proportion is more preferably equal to or greater than 0.03% by mass and even more preferably equal to or greater than 0.05% by mass. Also, this proportion is more preferably equal to or less than 0.3% by mass and even more preferably equal to or less than 0.2% by mass.

Optionally, the composition (X) may contain a curing catalyst (F). In that case, the curing catalyst (F) may promote, when the composition (X) is heated, the reaction between the epoxy resin (A) and the thiol compound (B) and thereby increase the curability of the composition (X).

The curing catalyst (F) contains at least one component selected from the group consisting of, for example, imidazoles, cycloamidines, tertiary amines, organic phosphines, tetra-substituted phosphonium/tetra-substituted borate, quaternary phosphonium salt having a counter anion other than borate, and tetraphenyl boron salts.

The curing catalyst (F) preferably contains a latent curing catalyst. This may suppress the reaction between the epoxy resin (A) and the thiol compound (B) in the composition (X) that is not heated and increase the storage stability of the composition (X). The latent curing catalyst may contain at least one of a liquid latent curing accelerator or a solid dispersion latent curing accelerator. The curing catalyst (F) preferably contain a microcapsule latent curing catalyst (F1), for example. The microcapsule latent curing catalyst (F1) includes a core made of a compound having catalyst activity and a shell covering the core and made of an epoxy resin, for example. The microcapsule latent curing catalyst (F1) contains, as a compound having catalyst activity, a microencapsulated imidazole including an imidazole.

The proportion of the curing catalyst (F) with respect to the total of the epoxy resin (A) and the thiol compound (B) may be, for example, equal to or greater than 3% by mass and equal to or less than 20% by mass. This proportion is more preferably equal to or greater than 5% by mass and even more preferably equal to or greater than 8% by mass. Also, this proportion is more preferably equal to or less than 15% by mass and even more preferably equal to or less than 12% by mass.

If the composition (X) contains the microcapsule latent curing catalyst (F1), then the composition (X) preferably further contains an organic boric acid compound (G). This makes it easier to further increase the storage stability of the composition (X). Specifically, if the composition (X) just contains the microcapsule latent curing catalyst (F1), the microcapsule latent curing catalyst (F1) may fail to increase the storage stability of the composition (X) so much. In contrast, further adding the organic boric acid compound (G) to the composition (X) may make the storage stability of the composition (X) sufficiently high. The reason is not perfectly clear but is presumably as follows. Specifically, the composition (X) cannot have its storage stability increased sufficiently just by adding the microcapsule latent curing catalyst (F1) thereto probably because the coexistence of the radical polymerizable compound (C) and the microcapsule latent curing catalyst (F1) in the composition (X) would cause the radical polymerizable compound (C) to act on the shell of the microcapsule latent curing catalyst (F1), thus making it more likely to expose the compound having catalyst activity inside the shell. Also, the organic boric acid compound (G) increases the storage stability probably because such action of the radical polymerizable compound (C) is inhibited by the organic boric acid compound (G), thus making it less likely to expose the compound having catalyst activity.

The organic boric acid compound (G) contains at least one borate ester selected from the group consisting of, for example, triethyl borate, tributyl borate, and triisopropyl borate.

The proportion of the organic boric acid compound (G) with respect to the total of the epoxy resin (A), the thiol compound (B), and the curing catalyst (F) is preferably equal to or greater than 0.03% by mass and equal to or less than 2% by mass. Setting this proportion at a value equal to or greater than 0.03% by mass makes it particularly easy to increase the storage stability of the composition (X). Also, setting this proportion at a value equal to or less than 2% by mass enables increasing the adhesion strength of the composition (X) that has been thermally cured. This proportion is more preferably equal to or greater than 0.05% by mass and even more preferably equal to or greater than 0.2% by mass. Also, this proportion is more preferably equal to or less than 1.5% by mass and even more preferably equal to or less than 1% by mass.

The composition (X) may contain a carbodiimide compound (H). This makes it easier to increase the reliability of a cured product of the composition (X). Specifically, if a cured product is formed by curing the composition (X) through a reaction between the epoxy resin (A) and the thiol compound (B), the cured product tends to deteriorate in a high-temperature, high-humidity environment. In contrast, adding the carbodiimide compound (H) to the composition (X) reduces the chances of causing such deterioration to the cured product.

The carbodiimide compound (H) is a compound with a carbodiimide group (—N═C═N—) in its molecule. The carbodiimide compound may contain at least one selected from the group consisting of polycarbodiimides, monocarbodiimides, and cyclic carbodiimides. The polycarbodiimide may include at least one of an aliphatic polycarbodiimide or an aromatic polycarbodiimide. The main chain of the aliphatic polycarbodiimide is constituted of aliphatic hydrocarbon. The main chain of the aromatic polycarbodiimide is constituted of aromatic hydrocarbon. The monocarbodiimide may include at least one of an aliphatic monocarbodiimide or an aromatic monocarbodiimide.

The monocarbodiimide includes at least one selected from the group consisting of, for example, N,N'-di-o-toluylcarbodiimide, N,N'-diphenylcarbodiimide, N,N'-di-2,6-dimethylphenyl-carbodiimide, N,N'-bis(2,6-diisopropylphenyl)carbodiimide, N,N'-bis (propylphenyl)-carbodiimide, N,N'-dioctyldecylcarbodiimide, N-triyl-N'-cyclohexylcarbodiimide, N,N'-di-2,2-di-tert-butylphenylcarbodiimide, N-triyl-N'-phenylcarbodiimide, N,N'-di-p-nitrophenyl-carbodiimide, N,N'-di-p-aminophenylcarbodiimide, N,N'-di-p-hydroxyphenylcarbodiimide, N,N'-dicyclohexylcarbodiimide, and N,N'-di-p-toluylcarbodiimide.

The polycarbodiimide is a compound expressed by, for example, the following formula:

$$R^2—(—N═C═N—R^1—)_m—R^3$$

In this formula, m $R^1$ each independently indicate either a divalent aromatic group or an aliphatic group. If $R^1$ is an aromatic group, $R^1$ may be replaced with at least one of an aliphatic substituent having at least one carbon atom, an alicyclic substituent, or an aromatic substituent. These substituents may have a heteroatom and these substituents may also be substituted for at least one ortho position of the aromatic group to which the carbodiimide group is bonded. $R^2$ is an alkyl group having 1 to 18 carbon atoms, a cycloalkyl group having 5 to 18 carbon atoms, an aryl group, an aralkyl group having 7 to 18 carbon atoms, $—R^4—NH—COS—R^5$, $—R^4COOR^5$, $—R^4—OR^5$, $—R^4—N(R^5)_2$, $—R^4—SR^5$, $—R^4—OH$, $—R^4—NH_2$, $—R^4—NHR^5$, $—R^4$-epoxy, $—R^4—NCO$, $—R^4—NHCONHR^5$, $—R^4—NHCONR^5R^6$, or $—R^4—NHCOOR^7$. $R^3$ is —N═C═N-aryl, —N═C═N-alkyl, —N═C═N-cycloalkyl, —N═C═N-aralkyl, —NCO, $—NHCONHR^5$, $—NHCONHR^5R^6$, $—NHCOOR^7$, $—NHCOS—R^5$, $—COOR^5$, $—OR^5$, epoxy, $—N(R^5)_2$, $—SR^5$, —OH, $—NH_2$, or $—NHR^5$. $R^4$ is either a divalent aromatic group or aliphatic group. $R^5$ and $R^6$ each independently indicate an alkyl group having 1 to 20 carbon atoms, a cycloalkyl group having 3 to 20 carbon atoms, an aralkyl group having 7 to 18 carbon atoms, an oligo/polyethylene glycol, or an oligo/polypropylene glycol. $R^7$ either includes one of these components of $R^5$ or is a polyester group or a polyamide group. m is an integer equal to or greater than 2.

The polycarbodiimide includes at least one selected from the group consisting of, for example, poly(4,4'-dicyclohexylmethane carbodiimide), poly(N,N'-di-2,6-diisopropylphenyl carbodiimide), and poly (1,3,5-triisopropylphenylene-2, 4-carbodiimide). Examples of commercially available polycarbodiimides include an aliphatic polycarbodiimide (ELASTOSTAB H-01 manufactured by Nisshinbo Chemical Inc.) and a carbodiimide-modified isocyanate (CARBODILITE V-05 manufactured by Nisshinbo Chemical Inc.).

The proportion of the carbodiimide compound (H) with respect to the total of the epoxy resin (A), the thiol compound (B), and the radical polymerizable compound (C) is preferably equal to or greater than 0.2% by mass and equal to or less than 35% by mass. Setting this proportion at a value equal to or greater than 0.2% by mass makes it particularly easy to increase the reliability of the cured product. Also, setting this proportion at a value equal to or less than 35% by mass ensures that a deep part is cured sufficiently at the time of photocuring. This proportion is more preferably equal to or greater than 1% by mass and even more preferably equal to or greater than 5% by mass. Also, this proportion is more preferably equal to or less than 25% by mass and even more preferably equal to or less than 15% by mass.

Optionally, the composition (X) may contain an inorganic filler (I). This may reduce the chances of causing shrinkage involved with curing during the process in which a cured product is formed by curing the composition (X). This makes the composition (X) even more suitably usable for bonding parts of a precision device such as a camera module.

The inorganic filler (I) contains at least one selected from the group consisting of, for example, silica, alumina, barium sulfate, talc, clay, mica, aluminum hydroxide, magnesium hydroxide, calcium carbonate, magnesium carbonate, magnesium oxide, boron nitride, aluminum borate, barium titanate, strontium titanate, calcium titanate, magnesium titanate, bismuth titanate, titanium oxide, barium zirconate, and calcium zirconate.

The inorganic filler (I) preferably contains a material having a mean particle size equal to or greater than 1 μm and equal to or less than 50 μm (hereinafter referred to as a "first filler (I1)"). This may increase the content of the inorganic filler added while reducing an increase in viscosity. Note that the mean particle size is a median diameter (D50) calculated based on a particle size distribution obtained by laser scattering method.

Optionally, the inorganic filler (I) may also contain a material having a mean particle size equal to or greater than 10 nm and equal to or less than 500 nm (hereinafter referred to as a "second filler (I2)"). This may impart shape retention properties to the resin composition. Note that the mean particle size is a median diameter (D50) calculated based on a particle size distribution obtained by dynamic light scattering method.

The inorganic filler (I) may contain either or both of the first filler (I1) and the second filler (I2), whichever is appropriate.

The proportion of the inorganic filler (I) with respect to the composition (X) is preferably equal to or greater than 0% by mass and equal to or less than 90% by mass. This proportion is more preferably equal to or greater than 10% by mass and even more preferably equal to or greater than 20% by mass. Also, this proportion is more preferably equal to or less than 80% by mass and even more preferably equal to or less than 70% by mass.

The composition (X) may further contain additives other than the components described above. The additive includes at least one selected from the group consisting of, for example, diluents, solvents, pigments, flexibility-imparting agents, coupling agents, antioxidants, thixotropy-imparting agents, and dispersants.

The composition (X) may be prepared by mixing the above-described components of the composition (X).

As described above, the composition (X) may be used as an adhesive. That is to say, a cured product may be formed by curing the composition (X) and may be used to bond two parts that form a device, for example (hereinafter referred to as a "first part" and a "second part," respectively).

A cured product according to this embodiment is formed by curing the composition (X). As described above, the first part and the second part may be bonded together using this cured product.

A device according to this embodiment includes: a first part; a second part; and a cured product interposed between the first part and the second part to bond the first part and the second part together. The cured product is formed by curing the composition (X). The device may be a precision device such as a camera module as described above. However, this is only an example and should not be construed as limiting. Examples of the device include electronic parts such as semiconductor elements, integrated circuits, large-scale integrated circuits, transistors, thyristors, diodes, and capacitors. If the device is a camera module, bonding the first part and the second part together is, stated otherwise, bonding constituent members of the camera module. Examples of bonding the first and second parts include bonding a board and a camera housing and bonding a lens unit and the camera housing. Note that these are only examples of the first and second parts and should not be construed as limiting.

Examples of respective materials for the first and second parts include, without limitation, resins such as a liquid crystal polymer, resins such as polycarbonate, resins such as polyester, metals such as nickel and copper, ceramics, resins such as polyimide, glass, and various other board materials.

Next, a method for bonding the first and second parts using the composition (X) and a method for manufacturing a device including the first part, the second part, and the cured product will be described.

The composition (X) is interposed between the first part and the second part. In this state, the composition (X) is irradiated with light, thereby temporarily bonding the first part and the second part together.

The wavelength of the light that irradiates the composition (X) is selected appropriately according to the types of the radical polymerizable compound (C) and photo radical polymerization initiator (D) included in the composition (X) to advance the photo radical polymerization reaction of the radical polymerizable compound (C). The light may be an ultraviolet ray, for example.

Note that the light that irradiates the composition (X) advances the photo radical polymerization reaction of the radical polymerizable compound (C) and the ene-thiol reaction between the thiol compound (B) and the radical polymerizable compound (C) as described above but does not advance the reaction between the epoxy resin (A) and the thiol compound (B). Thus, irradiating the composition (X) with light turns the composition (X) into a viscous state even though the composition (X) has not been cured completely yet. Therefore, the first and second parts turn into a loosely bonded state due to the viscosity of the composition (X). This is the temporarily bonded state. In the temporarily bonded state, the alignment precision may be increased easily by appropriately adjusting the relative positions of the first and second parts.

Subsequently, a cured product is formed by heating the composition (X). That is to say, the composition (X) is further cured by advancing, with heat, the reaction between the epoxy resin (A) and the thiol compound (B) in the composition (X), thereby forming a cured product. As a result, the first and second parts are bonded more firmly via the cured product than in the case of temporary bonding. The heating condition is appropriately set according to the types of the epoxy resin (A) and the thiol compound (B) and the type of the curing catalyst (F), if any, to sufficiently advance the reaction between the epoxy resin (A) and the thiol compound (B). The heating condition may include, for example, a heating temperature equal to or higher than 60° C. and equal to or lower than 100° C. and a heating time equal to or longer than 30 minutes and equal to or shorter than 120 minutes. As can be seen, the composition (X) may be cured, according to this embodiment, at a relatively low temperature.

EXAMPLES

Next, more specific examples of this embodiment will be presented. Not that the examples to be described below are only examples of this embodiment and should not be construed as limiting.

1. Preparation of Composition

A composition was prepared by mixing together the materials shown in the tables. Following are the details of the materials shown in the tables:

- Epoxy resin 1: liquid bisphenol A epoxy resin, product number YD8125 manufactured by NIPPON STEEL Chemical & Materials Co., Ltd.;
- Epoxy resin 2: liquid bisphenol F epoxy resin, product number YDF8170 manufactured by NIPPON STEEL Chemical & Materials Co., Ltd.;
- Epoxy resin 3: naphthalene-skeleton-containing liquid epoxy resin, product number HP-4032D manufactured by DIC Corporation;
- Thiol compound 1: trimethylolpropane tris(3-mercaptopropionate);
- Thiol compound 2: product name DPMP manufactured by SC Organic Chemical Co., Ltd.;
- Radical polymerizable compound 1: trimethylolpropane triacrylate, product name Viscoat #295 manufactured by Osaka Organic Chemical Industry Ltd.;
- Radical polymerizable compound 2: triallyl isocyanurate;
- Photo radical polymerization initiator 1: 1-hydroxycyclohexyl-phenyl ketone, product name Omnirad 184 manufactured by IGM Resins B.V.;
- Photo radical polymerization initiator 2: 2,4,6-trimethylbenzoyl-diphenylphosphine oxide, product name Omnirad TPO G manufactured by IGM Resins B.V.;
- Curing catalyst 1: microencapsulated imidazole, product name Novacure HXA9322HP manufactured by Asahi Kasei E-Materials Inc.;
- Radical scavenger 1: N-nitroso-N-phenylhydroxylamine aluminum salt, product number Q-1301 manufactured by FUJIFILM Wako Pure Chemical Corporation;
- Radical scavenger 2: product number SANDANT 2246 manufactured by Sanshin Chemical Industry Co., Ltd.;
- Boric acid compound 1: triethyl borate;
- Boric acid compound 2: triisopropyl borate;
- Carbodiimide compound 1: cyclic carbodiimide, product number TCC-FP20M manufactured by Teijin Limited;
- Carbodiimide compound 2: polycarbodiimide, product name CARBODILITE V-05 manufactured by Nisshinbo Chemical Inc.;
- Inorganic filler 1: spherical silica having a mean particle size of 15 μm, product number FB-940 manufactured by Denka Co., Ltd.;
- —Inorganic filler 2: spherical silica having a mean particle size of 0.6 μm, product number SO-25R manufactured by Admatechs; and
- Coupling agent 1: 3-glycidyloxypropyltrimethoxysilane, product number A-187 manufactured by Momentive Performance Materials.

2. Evaluation Tests (1) Photocurability

A black plastic cylinder having an inside diameter of 3 mm was arranged to have its longitudinal axis aligned with the vertical direction and the composition was poured into the cylinder to reach the top of the cylinder. Then, the top of the cylinder was irradiated with an ultraviolet ray having a peak wavelength of 365 nm at an illuminance of 500 $mW/cm^2$ for an irradiation time of 3 seconds.

A cured part of the composition was unloaded from the cylinder and had its length measured using a digital vertical caliper. If this part turned out to have a length equal to or longer than 0.3 mm, then the sample was graded "A." If this part turned out to have a length equal to or longer than 0.2 mm and shorter than 0.3 mm, then the sample was graded "B." If this part turned out to have a length shorter than 0.2 mm, then the sample was graded "C."

(2) Elastic Modulus

A mold release film made of polyethylene terephthalate was put on a glass plate and a silicone spacer, having a space with dimensions of 5 mm×150 mm in plan view and a thickness of 0.5 mm, was disposed on the mold release film. The composition was poured into the space inside the spacer, and then another mold release film made of polyethylene terephthalate was put on the upper surface of the spacer and another glass plate was put on the mold release film. The composition inside the space was irradiated from over the upper glass plate with an ultraviolet ray having a peak wavelength of 365 nm under the condition including a cumulative illuminance of 1500 mJ/cm$^2$. Subsequently, the composition was heated at 80° C. for one hour to be thermally cured. In this manner, a cured product was formed. This cured product was subjected to a tensile test in compliance with the JIS K7127 standard. Based on the test results, the tensile elastic modulus of the cured product was calculated.

(3) Storage Stability

The composition was introduced into an opaque container and had its viscosity at 25° C. measured using a type B viscometer under the condition including the number of revolutions of 20 rpm. The viscosity was measured continuously. Based on the measurement results, the time it took for the viscosity at 25° C. to reach a value 1.5 times as large as the initial value was regarded as an index to storage stability.

(4) Adhesion Strength (Initial)

An applied film with a diameter of 5 mm and a thickness of 0.5 was formed by applying the composition onto an adherend made of a liquid crystal polymer (product name E463i manufactured by Polyplastics Co., Ltd.). This applied film was irradiated with an ultraviolet ray having a peak wavelength of 365 nm under the condition including a cumulative illuminance of 1500 mJ/cm$^2$. Subsequently, the composition was heated at 80° C. for one hour to be thermally cured. In this manner, a cured product was formed. A shear adhesion strength of the cured product to the adherend was measured using a shear tester.

(5) Adhesion Strength (after High-Temperature, High-Humidity Test)

A cured product, which had been formed in the same way as described for the "(4) Adhesion strength (initial)" section and which was still laid on top of the adherend, was loaded into an 85° C./85% high-temperature, high-humidity vessel for 100 hours and then unloaded from the vessel. When 30-60 minutes passed since the point in time when the cured product was unloaded from the high-temperature, high-humidity vessel, a shear adhesion strength of the cured product to the adherend was measured in the same way as described for the "(4) Adhesion strength (initial)" section.

(6) Shrinkage Ratio

A cured product was formed in the same way as described for the "(2) Elastic modulus" section. Then, the shrinkage ratio was calculated based on the respective specific gravities of the composition and the cured product in compliance with the JIS K5600 standard.

TABLE 1

| | | | Examples | | | | | | |
|---|---|---|---|---|---|---|---|---|---|
| | | | 1 | 2 | 3 | 4 | 5 | 6 | 7 |
| Materials/ parts by mass | A | Epoxy resin 1 | 18.02 | 17.16 | 17.16 | 5.76 | 5.98 | 5.25 | 5.77 |
| | | Epoxy resin 2 | 18.02 | 17.16 | 17.16 | 5.76 | 5.98 | 5.25 | 5.77 |
| | | Epoxy resin 3 | | | | | | | |
| | B | Thiol compound 1 | 39.98 | 38.08 | 38.08 | 12.77 | 13.28 | 11.66 | 12.80 |
| | | Thiol compound 2 | | | | | | | |
| | C | Radical polymerizable compound 1 | 12.34 | 11.79 | 11.79 | 3.95 | 4.10 | 3.63 | 3.95 |
| | | Radical polymerizable compound 2 | 1.37 | 1.31 | 1.31 | 0.44 | 0.46 | 0.40 | 0.44 |
| | D | Photo radical polymerization initiator 1 | 0.69 | 0.65 | 0.65 | 0.22 | 0.23 | 0.20 | 0.22 |
| | | Photo radical polymerization initiator 2 | 0.27 | 0.26 | 0.26 | 0.09 | 0.09 | 0.08 | 0.09 |
| | E | Radical scavenger 1 | 0.10 | 0.10 | 0.10 | 0.10 | 0.10 | 0.10 | 0.10 |
| | | Radical scavenger 2 | | | | | | | |
| | F | Curing catalyst 1 | 6.84 | 6.52 | 6.52 | 2.19 | 2.27 | 2.00 | 2.19 |
| | G | Boric acid compound 1 | 0.27 | 0.26 | 0.26 | 0.09 | 0.09 | 0.08 | 0.02 |
| | | Boric acid compound 2 | | | | | | | |
| | H | Carbodiimide compound 1 | | 4.61 | | 1.55 | 0.32 | 4.24 | 1.55 |
| | | Carbodiimide compound 2 | | | 4.61 | | | | |
| | I | Inorganic filler 1 | 2.00 | 2.00 | 2.00 | 52.00 | 52.00 | 52.00 | 52.00 |
| | | Inorganic filler 2 | | | | 15.00 | 15.00 | 15.00 | 15.00 |
| | — | Coupling agent 1 | 0.10 | 0.10 | 0.10 | 0.10 | 0.10 | 0.10 | 0.10 |
| | X | Total | 100.00 | 100.00 | 100.00 | 100.00 | 100.00 | 100.00 | 100.00 |
| Evaluation | | Photocurability | A | A | A | A | A | B | A |
| | | Tensile elastic modulus/MPa | 300 | 400 | 400 | 700 | 66 | 900 | 700 |
| | | Storage stability | >7 days | >7 days | >2 days | >7 days | >7 days | >7 days | >5 days |
| | | Adhesion strength (initial)/MPa | 5 | 7 | 8 | 7 | 6 | 8 | 7 |
| | | Adhesion strength (after high-temperature, high-humidity test)/MPa | 2 | 6 | 7 | 6 | 5 | 8 | 6 |
| | | Shrinkage ratio/% | 7 | 7 | 7 | 2.5 | 2.5 | 2.5 | 2.5 |

| | | | Examples | | | | | |
|---|---|---|---|---|---|---|---|---|
| | | | 8 | 9 | 10 | 11 | 12 | 13 |
| Materials/ parts by mass | A | Epoxy resin 1 | 5.70 | 5.77 | 5.72 | 6.02 | 4.65 | 5.77 |
| | | Epoxy resin 2 | 5.70 | 5.77 | 5.72 | 6.02 | 4.65 | 5.77 |
| | | Epoxy resin 3 | | | | | | |
| | B | Thiol compound 1 | 12.66 | 12.80 | 12.69 | 13.37 | 10.31 | 12.81 |
| | | Thiol compound 2 | | | | | | |
| | C | Radical polymerizable compound 1 | 3.95 | 3.96 | 3.93 | 4.13 | 3.23 | 3.95 |
| | | Radical polymerizable compound 2 | 0.44 | 0.44 | 0.44 | 0.46 | 0.36 | 0.44 |

TABLE 1-continued

| | | | | | | | |
|---|---|---|---|---|---|---|---|
| D | Photo radical polymerization initiator 1 | 0.22 | 0.22 | 0.22 | 0.23 | 0.18 | 0.22 |
| | Photo radical polymerization initiator 2 | 0.09 | 0.09 | 0.09 | 0.09 | 0.07 | 0.09 |
| E | Radical scavenger 1 | 0.10 | 0.03 | 0.30 | 0.10 | 0.10 | 0.10 |
| | Radical scavenger 2 | | | | | | |
| F | Curing catalyst 1 | 2.17 | 2.19 | 2.17 | 2.29 | 1.76 | 2.19 |
| G | Boric acid compound 1 | 0.32 | 0.09 | 0.09 | 0.09 | 0.07 | 0.01 |
| | Boric acid compound 2 | | | | | | |
| H | Carbodiimide compound 1 | 1.55 | 1.55 | 1.54 | 0.10 | 7.51 | 1.55 |
| | Carbodiimide compound 2 | | | | | | |
| I | Inorganic filler 1 | 52.00 | 52.00 | 52.00 | 52.00 | 52.00 | 52.00 |
| | Inorganic filler 2 | 15.00 | 15.00 | 15.00 | 15.00 | 15.00 | 15.00 |
| — | Coupling agent 1 | 0.10 | 0.10 | 0.10 | 0.10 | 0.10 | 0.10 |
| X | Total | 100.00 | 100.00 | 100.00 | 100.00 | 100.00 | 100.00 |
| Evaluation | Photocurability | A | A | B | A | B | B |
| | Tensile elastic modulus/MPa | 700 | 700 | 700 | 600 | 1000 | 700 |
| | Storage stability | >10 days | >7 days | >7 days | >7 days | >7 days | >3 days |
| | Adhesion strength (initial)/MPa | 7 | 7 | 7 | 6 | 8 | 7 |
| | Adhesion strength (after high-temperature, high-humidity test)/MPa | 6 | 6 | 6 | 5 | 8 | 6 |
| | Shrinkage ratio/% | 2.5 | 2.5 | 2.5 | 2.5 | 2.5 | 2.5 |

TABLE 2

| | | | Examples | | | | | | |
|---|---|---|---|---|---|---|---|---|---|
| | | | 14 | 15 | 16 | 17 | 18 | 19 | 20 |
| Materials/ parts by mass | A | Epoxy resin 1 | 5.68 | 5.77 | 5.67 | 2.74 | 1.77 | 5.76 | 5.76 |
| | | Epoxy resin 2 | 5.68 | 5.77 | 5.67 | 2.74 | 1.77 | 5.76 | 5.76 |
| | | Epoxy resin 3 | | | | 5.49 | 3.55 | | |
| | B | Thiol compound 1 | 12.60 | 12.80 | 12.58 | 13.30 | 8.59 | 12.77 | 12.77 |
| | | Thiol compound 2 | | | | | 8.59 | | |
| | C | Radical polymerizable compound 1 | 3.95 | 3.96 | 3.89 | 3.95 | 3.95 | 3.95 | 3.95 |
| | | Radical polymerizable compound 2 | 0.44 | 0.44 | 0.43 | 0.44 | 0.44 | 0.44 | 0.44 |
| | D | Photo radical polymerization initiator1 | 0.22 | 0.22 | 0.22 | 0.22 | 0.22 | 0.22 | 0.22 |
| | | Photo radical polymerization initiator 2 | 0.09 | 0.09 | 0.09 | 0.09 | 0.09 | 0.09 | 0.09 |
| | E | Radical scavenger 1 | 0.10 | 0.01 | 0.60 | 0.10 | 0.10 | | 0.10 |
| | | Radical scavenger 2 | | | | | | 0.10 | |
| | F | Curing catalyst 1 | 2.16 | 2.19 | 2.15 | 2.19 | 2.19 | 2.19 | 2.19 |
| | G | Boric acid compound 1 | 0.43 | 0.09 | 0.09 | 0.09 | 0.09 | 0.09 | |
| | | Boric acid compound 2 | | | | | | | 0.09 |
| | H | Carbodiimide compound 1 | 1.55 | 1.55 | 1.52 | 1.55 | 1.55 | 1.55 | 1.55 |
| | | Carbodiimide compound 2 | | | | | | | |
| | I | Inorganic filler 1 | 52.00 | 52.00 | 52.00 | 52.00 | 52.00 | 52.00 | 52.00 |
| | | Inorganic filler 2 | 15.00 | 15.00 | 15.00 | 15.00 | 15.00 | 15.00 | 15.00 |
| | — | Coupling agent 1 | 0.10 | 0.10 | 0.10 | 0.10 | 0.10 | 0.10 | 0.10 |
| | X | Total | 100.00 | 100.00 | 100.00 | 100.00 | 100.00 | 100.00 | 100.00 |
| Evaluation | | Photocurability | A | A | B | A | A | A | A |
| | | Tensile elastic modulus/MPa | 700 | 700 | 700 | 1200 | 1400 | 700 | 700 |
| | | Storage stability | >14 days | >3 days | >14 days | >7 days | >7 days | >7 days | >7 days |
| | | Adhesion strength (initial)/MPa | 7 | 7 | 7 | 9 | 9 | 7 | 7 |
| | | Adhesion strength (after high-temperature, high-humidity test)/MPa | 6 | 6 | 6 | 8 | 8 | 6 | 6 |
| | | Shrinkage ratio/% | 2.5 | 2.5 | 2.5 | 2.5 | 2.5 | 2.5 | 2.5 |

| | | | Examples | | | Comparative examples | | |
|---|---|---|---|---|---|---|---|---|
| | | | 21 | 22 | 23 | 1 | 2 | 3 |
| Materials/ parts by mass | A | Epoxy resin 1 | 10.14 | 13.65 | 17.22 | 17.23 | 17.18 | 20.19 |
| | | Epoxy resin 2 | 10.14 | 13.65 | 17.22 | 17.23 | 17.18 | 20.19 |
| | | Epoxy resin 3 | | | | | | |
| | B | Thiol compound 1 | 22.50 | 30.29 | 38.20 | 38.24 | 38.11 | 44.79 |
| | | Thiol compound 2 | | | | | | |
| | C | Radical polymerizable compound 1 | 6.97 | 9.38 | 11.79 | 11.80 | 11.80 | |
| | | Radical polymerizable compound 2 | 0.77 | 1.04 | 1.31 | 1.31 | 1.31 | |

TABLE 2-continued

| | | | | | | | |
|---|---|---|---|---|---|---|---|
| D | Photo radical polymerization initiator1 | 0.39 | 0.52 | 0.65 | 0.66 | 0.66 | |
| | Photo radical polymerization initiator 2 | 0.15 | 0.21 | 0.26 | 0.26 | 0.26 | |
| E | Radical scavenger 1 | 0.10 | 0.10 | 0.10 | | | 0.10 |
| | Radical scavenger 2 | | | | | | |
| F | Curing catalyst 1 | 3.85 | 5.18 | 6.54 | 6.54 | 6.52 | 7.67 |
| G | Boric acid compound 1 | 0.15 | 0.21 | | | 0.26 | 0.31 |
| | Boric acid compound 2 | | | | | | |
| H | Carbodiimide compound 1 | 2.73 | 3.67 | 4.61 | 4.62 | 4.62 | 4.66 |
| | Carbodiimide compound 2 | | | | | | |
| I | Inorganic filler 1 | 32.00 | 17.00 | 2.00 | 2.00 | 2.00 | 2.00 |
| | Inorganic filler 2 | 10.00 | 5.00 | | | | |
| — | Coupling agent 1 | 0.10 | 0.10 | 0.10 | 0.10 | 0.10 | 0.10 |
| X | Total | 100.00 | 100.00 | 100.00 | 100.00 | 100.00 | 100.00 |
| Evaluation | Photocurability | A | A | A | A | A | C |
| | Tensile elastic modulus/MPa | 600 | 500 | 300 | 300 | 300 | 500 |
| | Storage stability | >7 days | >7 days | 2 days | <1 day | <1 day | >7 days |
| | Adhesion strength (initial)/MPa | 7 | 7 | 7 | 7 | 7 | 7 |
| | Adhesion strength (after high-temperature, high-humidity test)/MPa | 6 | 6 | 6 | 6 | 6 | 6 |
| | Shrinkage ratio/% | 3.5 | 4.5 | 7 | 7 | 7 | 7 |

The invention claimed is:

1. A thermosetting composition containing:
an epoxy resin (A);
a thiol compound (B) having at least two thiol groups per molecule;
a radical polymerizable compound (C);
a photo radical polymerization initiator (D);
a radical scavenger (E); and
a carbodiimide compound (H), wherein:
a ratio of a thiol group equivalent of the thiol compound (B) to one epoxy equivalent of the epoxy resin (A) is equal to or greater than 0.75 and equal to or less than 10.0,
a proportion of the radical scavenger (E) with respect to an entirety of the thermosetting composition is equal to or greater than 0.03% by mass and equal to or less than 0.2% by mass, and
a proportion of the carbodiimide compound (H) with respect to the total of the epoxy resin (A), the thiol compound (B), and the radical polymerizable compound (C) is equal to or less than 15% by mass.

2. The thermosetting composition of claim 1, further containing a curing catalyst (F).

3. The thermosetting composition of claim 2, wherein
the curing catalyst (F) includes a microcapsule latent curing catalyst (F1).

4. The thermosetting composition of claim 3, further containing an organic boric acid compound (G).

5. The thermosetting composition of claim 1, further containing an inorganic filler (I).

6. The thermosetting composition of claim 1, wherein
the thermosetting composition is an adhesive.

7. The thermosetting composition of claim 2, further containing an inorganic filler (I).

8. The thermosetting composition of claim 3, further containing an inorganic filler (I).

9. The thermosetting composition of claim 4, further containing an inorganic filler (I).

10. The thermosetting composition of claim 6, further containing an inorganic filler (I).

11. A cured product formed by curing the thermosetting composition of claim 1.

12. The cured product of claim 11, further containing an inorganic filler (I).

13. A device comprising: a first part; a second part; and a cured product interposed between the first part and the second part to bond the first part and the second part together,
the cured product being formed by curing the thermosetting composition of claim 1.

14. A method for manufacturing a device, the device including: a first part; a second part; and a cured product interposed between the first part and the second part to bond the first part and the second part together, the method comprising:
interposing the thermosetting composition of claim 1 between the first part and the second part;
irradiating the thermosetting composition with light to temporarily bond the first part and the second part together; and then
heating the thermosetting composition to form the cured product.

* * * * *